United States Patent [19]

Yates

[11] Patent Number: 5,618,115
[45] Date of Patent: Apr. 8, 1997

[54] METHOD OF OPERATING A ROTATING ASSEMBLY

[75] Inventor: David E. Yates, Evesham, England

[73] Assignee: Rolls-Royce Power Engineering plc, Newcastle, England

[21] Appl. No.: 562,622

[22] Filed: Nov. 24, 1995

[30] Foreign Application Priority Data

Dec. 22, 1994 [GB] United Kingdom .................. 9425900
Jul. 19, 1995 [GB] United Kingdom .................. 9514767

[51] Int. Cl.⁶ .................................................. F16C 32/06
[52] U.S. Cl. ........................................ 384/110; 384/99
[58] Field of Search .................................. 384/110, 107, 384/117, 112, 99, 109

[56] References Cited

U.S. PATENT DOCUMENTS

| | | | |
|---|---|---|---|
| 3,575,334 | 4/1971 | Stamm | 384/99 |
| 3,721,480 | 3/1973 | Dee | 384/112 |
| 4,005,916 | 2/1977 | Dillon | 384/117 |
| 4,884,899 | 12/1989 | Schwartzman | 384/107 |

FOREIGN PATENT DOCUMENTS

| | | |
|---|---|---|
| 1033802 | 6/1966 | United Kingdom . |
| 1213514 | 11/1970 | United Kingdom . |
| 1462048 | 1/1977 | United Kingdom . |

*Primary Examiner*—Lenard A. Footland
*Attorney, Agent, or Firm*—Oliff & Berridge

[57] ABSTRACT

A rotating assembly (10) comprises an inner (12) and an outer ring (14) having a hydrostatic bearing therebetween. The bearing incorporates fluid passageways (30 and 32) between confronting surfaces (22, 24, 26 and 28) of the rings (12 and 14). When rotation is required the surfaces (22, 24, 26 and 28) are separated by the supply of a pressurised flow of fluid to both of the passageways (30 and 32). The bearing can be locked to prevent rotation by removal of the fluid in one of the passageways (32) whilst maintaining the flow of pressurised fluid in the other passageway (30) so as to hold confronting surfaces (26 and 28) in contact with one another. Frictional forces between the confronting surfaces (26 and 28) prevents rotation of the ring (14) and the flow of pressurised fluid prevents the confronting surfaces (26 and 28) separating under the application of a moment.

6 Claims, 1 Drawing Sheet

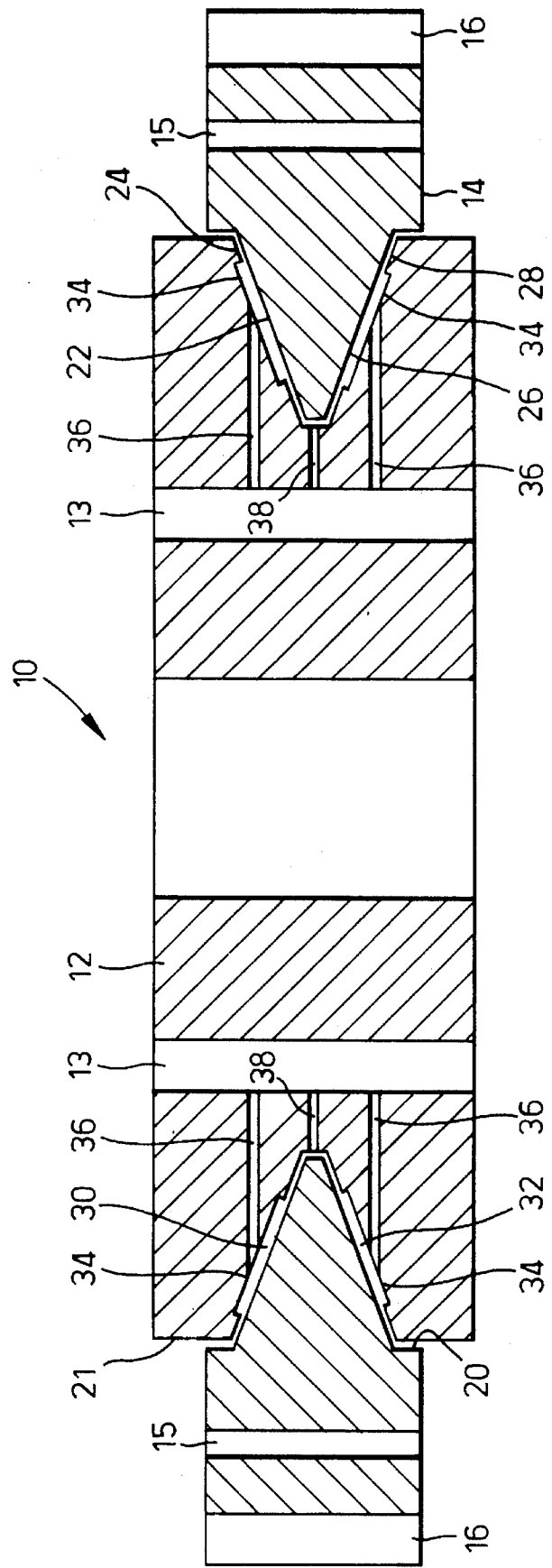

METHOD OF OPERATING A ROTATING ASSEMBLY

The present invention relates to a method of operating a rotating assembly and in particular to a method of operating a slewing ring intermittently.

Slewing rings are employed where slow accurately controlled rotation of heavy equipment is required. Slewing rings comprise an inner and an outer ring having a bearing therebetween to permit relative rotational movement between the rings.

Slewing rings incorporating hydrostatic bearings are known. The advantage of incorporating a hydrostatic bearing is that it offers a less expensive construction as no hardened roller tracks are required as for bearings which use rolling bearing elements.

In many applications the rotation of the slewing ring is intermittent. As the static loads experienced by the slewing ring are often greater than the dynamic loads it is advantageous to be able to lock the bearing between intermittent movements. In slewing rings incorporating a hydrostatic bearing this can be achieved by removal of the hydrostatic pressure from the bearing permitting the bearing surfaces to contact. The friction between the bearing surfaces opposes any rotational movement but is not effective in reacting against an applied moment.

The present invention seeks to provide a method of operating a rotating assembly incorporating a hydrostatic bearing which can be locked to oppose both rotational movement and an applied moment.

According to the present invention a method of operating a rotating assembly which comprises concentric inner and outer annular members having an at least one hydrostatic bearing therebetween, each bearing incorporates axially spaced apart passageways between confronting bearing surfaces on the inner and outer members, the bearing surfaces being capable of reacting axial loads, the method comprising the steps of supplying a flow of pressurised fluid to the passageways to separate the confronting surfaces of the inner and outer members to permit relative rotation of the annular members and then locking the bearing by removal of the flow of pressurised fluid from one of the passageways whilst maintaining the flow of pressurised fluid to the other passageway so as to hold at least one of the confronting surfaces on the inner annular member in contact with at least one of the confronting faces on the outer annular member, friction between the confronting faces held in contact preventing rotational movement of the members, the flow of pressurised fluid preventing separation of the surfaces in contact under the application of a moment.

In the preferred embodiment of the present invention the confronting faces on the inner and outer annular members are conical.

Preferably the pressurised fluid is provided to pockets in either the confronting face of the inner annular member of the outer annular member. Restrictors may be provided in the fluid supply to the pockets.

Either the inner or the outer annular member may be provided with teeth to facilitate rotation thereof.

The present invention will now be described by way of example and with reference to the accompanying drawing which is a cross-sectional view of a slewing ring in accordance with the present invention.

Referring to the drawing a slewing ring, generally indicated at 10, comprises an inner ring 12 and an outer ring 14 having a hydrostatic bearing therebetween.

In operation the inner ring 12 is fixed to a static structure by fastening means (not shown) which extend through apertures 13 provided therein. The component to be rotated relative to the static structure is attached to the outer ring 14 by fastening means (not shown) which extend through apertures 15 provided therein. The outer ring 14 is provided with teeth 16 which cooperate with external means (not shown) to facilitate rotation of the ring 14.

The hydrostatic bearing consists of two bearing surfaces 22 and 26 which project from the inner surface 20 of the outer ring 14. The bearing surfaces 22 and 26 confront bearing surfaces 24 and 28 provided in the outer surface 21 of the inner ring 12. The bearing surfaces 22, 24, 26 and 28 are conical and a clearance is provided between them.

In operation when rotation is required the bearing surfaces 22, 24, 26 and 28 are separated by the supply of a pressurised flow of fluid, such as oil. The oil is supplied to recesses 34 which define fluid passageways 30 and 32. The oil is supplied to the recesses 34 via ducts 36 and exhausts through duct 38. The pressure of the oil in the recesses 34 causes the bearing surfaces 22, 24, 26 and 28 to separate and acts as a lubricant to permit rotation of the outer ring 14 relative to the inner annular ring 12.

Restrictors (not shown) in the fluid supply to each recess 34 causes the pressure to drop as fluid leakage takes place. Thus the bearing surfaces 22, 24, 26 and 28 separate until the applied load balances the hydrostatic pressure in each recess 34. The hydrostatic pressure in the fluid passageways 30 and 32 react against one another to provide reaction against an applied axial load.

Rotation of the outer ring 14 is intermittent. Once the outer ring 14 has been rotated to the correct position the bearing is locked. Locking is achieved by the removal of the hydrostatic pressure from the lower fluid passageway 32 whilst pressure is maintained in the upper fluid passageway 30. The net hydrostatic pressure will provide a downward force which pushes the bearing surfaces 26 and 28 into contact. The contact between the bearing surfaces 26 and 28 provides static friction which opposes rotational movement. The hydrostatic pressure prevents the surfaces 26 and 28 parting under the application of a moment.

It will be appreciated by one skilled in the art that the bearing could be locked by removal of the hydrostatic pressure from the upper fluid passageway 30 whilst pressure is maintained in the lower fluid passageway 32. The net hydrostatic pressure will provide a upwards force which pushes the bearing surfaces 22 and 24 into contact. The contact between the bearing surfaces 22 and 24 provides static friction which opposes rotational movement and the hydrostatic pressure prevents the surfaces 22 and 24 parting under the application of a moment.

The assembly is reversible and each of the two rings can be either the fixed or rotating part of the assembly, the rotating part being provided with teeth allowing it to be rotated. Although the bearing surfaces shown are conical they could be radial or of any other orientation provided they can react axial loads.

One particular application of a slewing ring 10 in accordance with the present invention is to support the nacelle of a horizontal axis wind turbine. The slewing ring 10 rotates to align the turbine to the wind direction.

The slewing ring 10 is subject to the dead weight of the nacelle and the wind reaction forces. Due to the variability of the wind reaction forces it is necessary to damp the slewing ring 10 to minimise movement and consequent inertia forces.

The necessary damping is achieved by employing a highly viscous lubricant, such as grease, between the inner ring 12 and the outer ring 14 of the hydrostatic bearing.

I claim:

1. A method of operating a rotating assembly comprising concentric inner and outer annular members having an at least one hydrostatic bearing therebetween, each bearing incorporating axially spaced apart passageways between confronting bearing surfaces on the inner and outer members, the bearing surfaces being capable of reacting axial loads, the method comprising the steps of supplying a flow of pressurised fluid to the passageways to separate the confronting surfaces of the inner and outer members to permit relative rotation of the annular members and then locking the bearing by removal of the flow of pressurised fluid from one of the passageways whilst maintaining the flow of pressurised fluid to the other passageway so as to hold at least one of the confronting surfaces on the inner annular member in contact with at least one of the confronting surfaces on the outer annular member, friction between the confronting surfaces held in contact preventing rotational movement of the members, the flow of pressurised fluid preventing separation of the surfaces in contact under the application of a moment.

2. A method of operating a rotating assembly as claimed in claim 1 in which the confronting surfaces on the inner and outer annular members are conical.

3. A method of operating a rotating assembly as claimed in claim 1 in which the pressurised fluid is provided to recesses in the confronting surface of the inner annular member.

4. A method of operating a rotating assembly as claimed in claim 1 in which restrictors are provided in the fluid supply to each passageway.

5. A method of operating a rotating assembly as claimed in claim 1 in which the outer annular member rotates relative to the inner annular member and is provided with teeth to facilitate rotation thereof.

6. A method of operating a rotating assembly as claimed in of claims 1–4 in which the pressurised fluid is viscous to damp rotational movement of the inner and outer annular members.

* * * * *